Patented June 21, 1927.

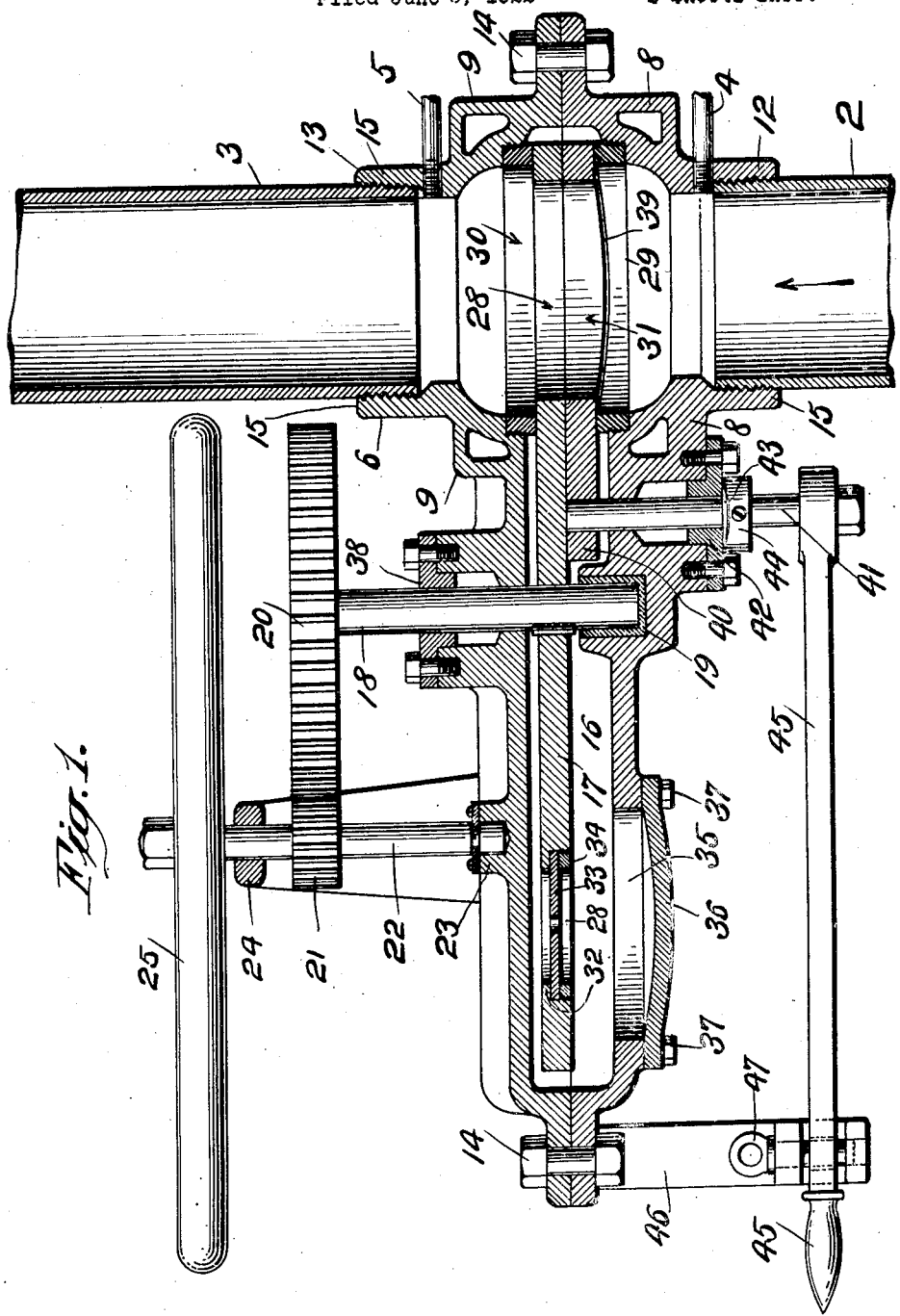

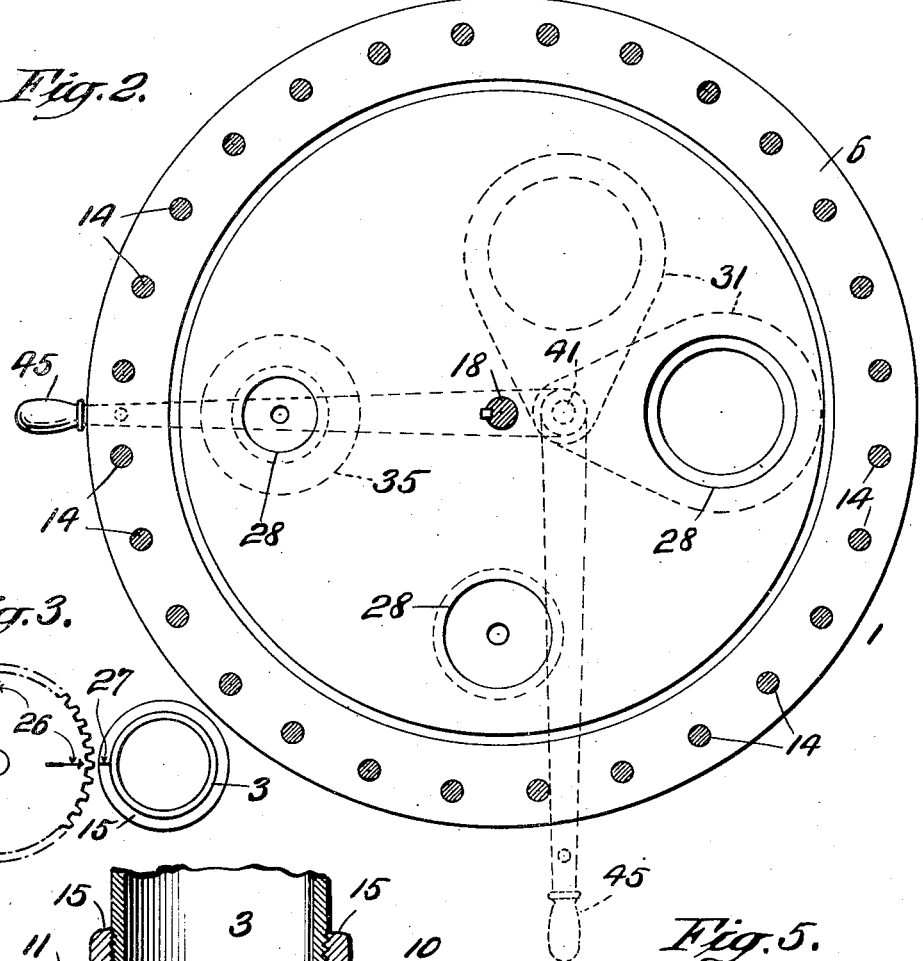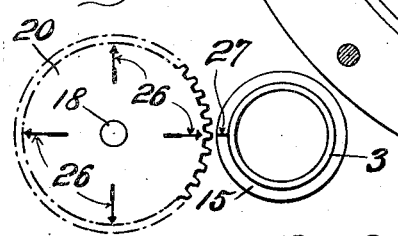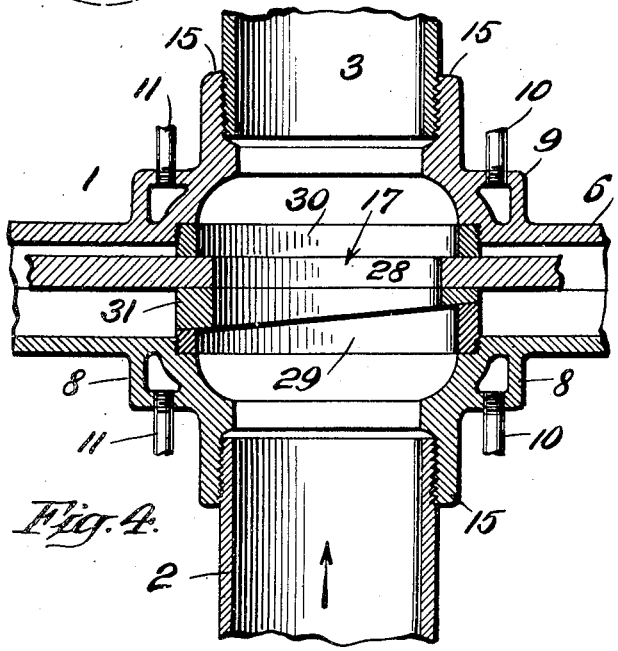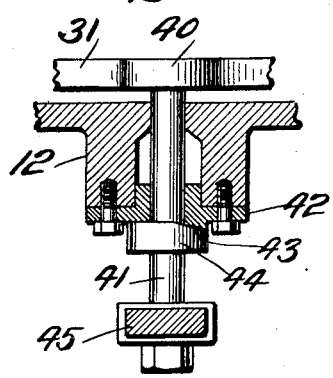

1,633,161

UNITED STATES PATENT OFFICE.

FRANK CAVENAGH, OF SENECA FALLS, NEW YORK.

REVOLVING-DISK VALVE.

Application filed June 8, 1922. Serial No. 566,891.

The object of my invention is to provide a revolving disk valve which may be applied to any suitable use and is particularly applicable to pipes where large volumes of gas or liquids are encountered, or high pressures obtained or wherever it is desirable to measure the gases passing through the valve. Heretofore, when such valves have been employed, it has been possible to repair or renew parts of said valves only when the valve is out of use. When a valve is made according to my invention, it is possible to repair or renew parts of the same while the valve is in full operation. A further object is to provide a valve which will wear equally at its opening at all times so that one part of the valve will not get worn out ahead of another part and the valve will always close with a tight fit until it is completely worn out. Yet a further object is to provide a valve through which a well may be drilled, bailed or "shot" in the conventional manner and which may be shut immediately when desired, so as to prevent a wastage either of gas or oil. Yet a further object is to provide a valve of the orifice type in which an orifice disk may be inspected, cleaned, repaired or removed without stopping the flow of fluid through the valve for more than a few seconds. These and other objects are accomplished by my invention, some embodiments of which are hereinafter more particularly set forth.

For a more detailed description of my invention, reference is to be had to the accompanying drawings, forming a part hereof, in which Figure 1 is a section through my improved valve.

Figure 2 is a top plan view of the same with parts shown in section.

Figure 3 shows a gear wheel with indicators thereon.

Figure 4 is a sectional view of the pipe and valve seat taken at right angles to the view shown in Figure 1.

Figure 5 is a sectional view, showing a detail of construction which relates to the locking device for the valve.

Throughout the various views of the drawings, similar reference characters designate similar parts.

My improved valve 1 is placed between an inflow pipe 2 and an outflow pipe 3, both of which are of the conventional kind, and used in the conventional manner. These pipes may represent the pipes of an oil well, a gas well, a steam heating system, gas mains or water mains or steam mains, or be used for any other purpose. The valve 1 or the pipes 2 and 3 adjacent thereto is also provided with two gauge pipes 4 and 5 respectively, which are mounted in the casing 6 of the valve in any suitable manner. This casing is also provided with two steam jackets 8 and 9 respectively, so that if desired, the valve may be heated where such heating is desirable because of a peculiar kind of fluid passing therethrough, as where gas passes with condensible substances therein. Steam is supplied to the interior of the jackets 8 and 9 by means of inflow pipes 10 and outflow pipes 11.

The casing 6 is composed of two shells, one of which 12 is attached to the inflow pipe 2 and the other of which 13 is attached to the outflow pipe 3. These shells have matching faces which are secured together with a fluid tight joint by suitable bolts 14. It will be noted that the collars 15 to which the pipes 2 and 3 are secured are not at the center of the parts 12 and 13, but are eccentrice and that these parts are so shaped as to have an interior circular chamber 16 in which is mounted a large circular disk 17 which is fixed to a stud shaft 18 that has one end mounted in a bearing 19 set in a suitable recess of the part 12 and its other end is provided with a gear 20 which is also fixed to this shaft and adapted to be driven by a pinion 21 which is fixed to a stud shaft 22 which has its inner end journaled in the part 13 at a bearing 23 and its outer end is supported by a suitable bearing 24 extending from the part 13 and carries a hand wheel 25 which is fixed to this shaft 22 and turns therewith. The upper surface of the gear 20 carries a number of marks 26 which are adapted to register with a projection 27 on the collar 15 so that it will be possible to tell by these marks just what opening 28 of the disk 17 is in register with the rings or valve seats or bushings 29 and 30 of the parts 12 and 13 between the pipes 2 and 3 and the wedge 31 which will be described below.

The openings 28 may be made in any of several ways. One opening may be made so as to be flush with the opening in the wedge 31 and others may be made with a shoulder 32 which is adapted to receive a perforated orifice disk 33 which is held in place by means of a screw washer 34 let into suitable threads, as indicated. Each orifice disk has an opening of a predetermined diameter so that when in use, a flow of fluid can take place through the orifice and measurements may be had through the pipes 4 and 5 in the conventional manner. Several such disks 33 are provided with different sized openings and any of several may be made to operate by turning the hand wheel 25 and throwing the desired disk into operation. As will appear below, any disk not in operation may be brought opposite a hand hole 35 which is normally covered by a cover plate 36 and held in place in the usual manner by means of nuts 37 on stud screws or in any other suitable way. By removing the cover plate 36 it is possible to have access to the disk 33 which is below the same so that this disk may be calibrated, cleaned or renewed, as desired, while a desired flow of gas or other fluid takes place through another opening in this disk 17 and through the pipes 2 and 3.

To prevent leakage the stud shaft 18 passes through a suitable stuffing box 38 in the conventional manner, as is apparent.

The wedge 31 is required to cause the disk 17 to fit snug against the ring 30 and therefore this wedge is made annular for the most part with a wedge surface 39 which is adapted to press against a corresponding surface of the ring 29. Another function is to make a tight joint between the interior of the pipes 2 and 3 and the chamber 16. This wedge 31 is also provided with a strong and laterally extending shank 40 which enters into the chamber 16 and is provided with a shaft 41 which passes through and turns in a stuffing box 42 of the conventional kind, except that on its outer surface it is provided with a cam 43 which is adapted to engage a corresponding cam surface on a collar 44 that is fixed to this stud shaft 41. The outer end of this shaft 41 is fixed to a handle 45 which may be drawn through substantially 90 degrees so as to throw the wedge into engagement with the disk 17 and the ring 29 and thereby form a tight joint with both and lock the disk 17 in place, or it may be thrown so as to be free of this disk and it is drawn free by the cam 43 and collar 44 which draw the wedge 31 away from the disk 17 when so turned.

In order that the disk 17 may be locked in place, it is necessary to lock the wedge 31 when in its wedging position and this is done by having a suitable bracket 46 with a bolt 47 which goes through suitable openings in the bracket and in the handle 45. If desired, a padlock may be passed through an opening in the bolt 47 which may register with a corresponding opening in the bracket 46. The bracket 46 is rigidly secured to the part 12.

In view of the foregoing, the operation of my improved valve will be readily understood, it being assumed, as is the case, that between the openings 28, the disk 17 has at least one solid space which may be used to close the passage between the pipes 2 and 3. For convenience of illustration, it will be assumed that this valve is in use on an oil or gas well which has just been bailed or "shot" and that the pipe 2 represents the top of the lining or casing through which gas or oil flows at a high pressure say 900 pounds to the square inch. It will be noted that the valve is in the position shown in Figure 1 when the drilling is completed or while it is going on and after the drilling tools have been removed and the well has been blown or "shot" and is coming in. If it is desired to shut off the well as soon as it has cleaned itself, the bolt 47 is withdrawn, the handle 45 is thrown from the position shown in full lines in Figure 2 to the position shown in dotted lines thereby releasing the wedge 31 and then the hand wheel 25 is turned until the disk 17 has a solid part between the collars 29 and 30 at which time the valve is closed and then the wedge 31 may be restored. If, thereafter, it is desired to open the valve and measure what flows through the valve, the wedge 31 is again removed and then a disk 33 is brought into position, according to the flow through the valve and the pressure, and then the flow through the orifice of the disk 33 may be measured in the conventional manner through the pipes 4 and 5, it being assumed that the wedge 31 is promptly restored into position after the disk 33 is in place. While one disk 33 is functioning, as above described, another may be opposite the hand hole 35 and undergoing cleaning and renewal or repairs, as above described.

It will be noted that when my improved valve is in operation, an opening 28 is in full registration with the pipes 2 and 3 and with the collars 29 and 30 so that equal wear will occur at all sides of the opening 28. If a reduced flow is desired, a disk 33 is employed with an opening of a reduced diameter so that equal wear still occurs. This is of very great importance because, as above specified, the valve is caused to wear equally at all parts which are worn by any fluid passing through the same. When the valve is open the seats 29 and 30 are covered and protected. As these fluids are often armed with grit, such as sharp sand, this matter of wear is sometimes of the utmost importance. If grit or fluids armed with grit wears one part of an opening of a valve more than another, the valve will wear so that it cannot be closed. This is most undesirable and this undesirable feature has been avoided in this valve wherein the opening 28 is smaller than the bushings 29 and 30 so that a great deal of wear about the opening 28 must occur before these bushings can wear at all and the valve will close tight, although greatly worn. Furthermore, the walls of the opening 28 can be removed and replaced by other walls while the valve is in use and the worn parts may be repaired or restored without interrupting such use.

While I have shown and described one embodiment of my invention, it is obvious that it is not restricted thereto, but that it is broad enough to cover all structures that come within the scope of the annexed claims.

Having thus described my invention, what I claim is:

1. In a valve of the class described, a casing with inflow and outflow openings, a perforated, rotary disk mounted therein, means for turning said disk perforations either into or out of registration with the inflow and outflow openings and locking and unlocking means for said disk including a perforated wedge through which fluids pass and a cam ring.

2. In a valve of the class described, a casing with inflow and outflow openings, a perforated disk mounted therein, means for throwing said disk perforations either into or out of registration with the inflow and outflow openings and locking means for said disk including a perforated wedge, a cam ring and cams for causing the wedge to leave the disk.

In testimony whereof, I have hereunto set my hand and seal this 5th day of June, 1922.

FRANK CAVENAGH. [L. S.]